United States Patent [19]
Laurer et al.

[11] Patent Number: 5,632,305
[45] Date of Patent: May 27, 1997

[54] APPARATUS FOR SECURING A PRESSURE VESSEL AGAINST OVER PRESSURE

[75] Inventors: Erwin Laurer, Möhrendorf; Hermann-Josef Conrads, Herzogenaurach; Rafael Mandl, Erlangen, all of Germany

[73] Assignee: Siemens Aktiengesellschaft, Munich, Germany

[21] Appl. No.: 511,699

[22] Filed: Aug. 4, 1995

Related U.S. Application Data

[63] Continuation of PCT/DE94/00051, published as WO94/18678, Aug. 18, 1994

[30] Foreign Application Priority Data

Feb. 5, 1993 [DE] Germany ............... 43 03 440.3

[51] Int. Cl.⁶ ............................................... F16K 13/10
[52] U.S. Cl. ............................................ 137/613; 137/251.1
[58] Field of Search ............................ 137/613, 251.1, 137/252; 251/175

[56] References Cited

U.S. PATENT DOCUMENTS

| | | | |
|---|---|---|---|
| 2,719,537 | 10/1955 | Gildersleeve | 137/251.1 |
| 3,111,959 | 11/1963 | Allen et al. | 137/251.1 |
| 4,497,467 | 2/1985 | DeWald et al. | 251/175 X |
| 5,398,719 | 3/1995 | Drossel et al. | 137/489.5 |

FOREIGN PATENT DOCUMENTS

| | | |
|---|---|---|
| 0160401 | 11/1985 | European Pat. Off. . |
| 0212949 | 3/1987 | European Pat. Off. . |
| 4041418 | 6/1992 | Germany . |

OTHER PUBLICATIONS

Patent Abstracts of Japan, vol. 14, No. 228 (M-0973) May 15, 1990 & JP-A-2057784 (Toshiba) Feb. 27, 1990.

*Primary Examiner*—Kevin Lee
*Attorney, Agent, or Firm*—Herbert L. Lerner; Laurence A. Greenberg

[57] ABSTRACT

An apparatus for securing a pressure vessel against over pressure includes a shaped part connected to a pressure vessel and a valve assembly being disposed on the shaped part. The valve assembly includes a housing block, at least one safety valve having a valve seat disposed in the housing block, a hydraulic seal for the safety valve, and a conduit being disposed inside the housing block and/or the shaped part for receiving the hydraulic seal.

10 Claims, 4 Drawing Sheets

APPARATUS FOR SECURING A PRESSURE VESSEL AGAINST OVER PRESSURE

CROSS-REFERENCE TO RELATED APPLICATION

This application is a Continuation of International application Ser. No. PCT/DE94/00051, filed Jan. 24, 1994 published as WO94/18678, Aug. 18, 1994.

BACKGROUND OF THE INVENTION

Field of the Invention

The invention relates to an apparatus for securing a pressure vessel against over pressure, including a valve assembly being disposed a shaped part (pressurizer dome) joined to the pressure vessel, the valve assembly including at least one safety valve with a valve seat in a housing block.

Such an apparatus is known from German Published, Non-Prosecuted application DE 40 41 418 A1, corresponding to U.S. application Ser. No. 08/080,569, filed Jun. 21, 1993, U.S. Pat. No. 5,398,719. It is used in a primary loop of a pressurized water reactor to keep the pressure in the primary loop below an allowable maximum pressure, of about 170 bar, for instance. To that end, a pressurizer or pressure vessel in a primary loop is connected to a blowoff vessel through a safety valve. In a demand mode or a testing mode, the safety valve is opened through a pilot valve. The actuation of the pilot valve is brought about by the pressure prevailing in the pressure vessel.

In a normal mode, the pressure medium prevails at a valve seat and on a front side of a valve plate of a safety valve at the primary loop pressure of approximately 155 bar and at a primary loop temperature of approximately 350° C. Conversely, downstream of the valve seat and on a rear side of the valve plate, only atmospheric pressure prevails. Due to the resultant temperature difference between the front and back sides of the valve plate, if even only slight gradual leakage occurs, water droplets that bring about local cooling will form on the markedly cooler back side of the valve plate, or in other words downstream of the valve seat. That in turn causes thermal distortion of the valve plate and/or of the valve seat in the housing, so that the initial gradual leak can grow so large that it can no longer be controlled by cooling technology in a blowoff vessel. The result can be that the entire plant has to be shut down.

SUMMARY OF THE INVENTION

It is accordingly an object of the invention to provide an apparatus for securing a pressure vessel against over pressure loss, which overcomes the hereinafore-mentioned disadvantages of the heretofore-known devices of this general type and which assures adequate tightness and in particular seat tightness.

With the foregoing and other objects in view there is provided, in accordance with the invention, an apparatus for securing a pressure vessel against over pressure, comprising a shaped part connected to a pressure vessel; and a valve assembly being disposed on the shaped part, the valve assembly including a housing block, a safety valve having a valve seat disposed in the housing block, a hydraulic seal for the safety valve, and a conduit being disposed inside the housing block and/or the shaped part for receiving the hydraulic seal.

The term "shaped part" is understood in this case to refer to a connecting neck, attachment, or connector piece of arbitrary shape, especially a so-called pressurizer dome for nuclear power plant pressure vessels.

The hydraulic seal, which is formed, for example, by steam condensing in the conduit, has the effect of a thermal bridge when the safety valve is closed. In the normal mode, it is normally therefore not hot steam, but rather comparatively cooler water, that is present in the housing block of the valve assembly in the region of the valve seat.

In accordance with another feature of the invention, there are provided more than one and preferably three valve assemblies, distributed over the circumference of the shaped part.

In accordance with a further feature of the invention, the valve assembly or assemblies are flanged radially to the tubular shaped part.

In order to avert a temperature shock in the response mode or the testing mode in the region of the valve seat caused by a relatively large temperature difference between the water of the hydraulic seal, which initially flows out through the safety valve, and the hot steam from the pressure vessel that follows it, a temperature gradient is advantageously established in purposeful fashion along the hydraulic seal.

In accordance with an added feature of the invention, the temperature gradient is attained by providing the valve assembly or each valve assembly with a heat insulation, having an insulating action that decreases along the conduit for the hydraulic seal. The decrease in the insulating action can be effected by a stepwise or continuous reduction in the thickness of the insulating wall or by a lesser heat insulating action. Through the use of this kind of intentionally reduced local heat insulation, a temperature gradient along the conduit carrying the hydraulic seal of approximately 300° to 350° C. at the transition between steam and water in the region of the shaped part can be purposefully adjusted to approximately 150° to 200° C. at the valve seat.

In accordance with an additional feature of the invention, the conduit for the hydraulic seal, which extends inside the housing block of the valve assembly, may be constructed in various ways. For instance, it may extend horizontally or in inclined fashion toward the valve seat. Alternatively, it may be constructed in siphon-like fashion.

In accordance with a concomitant feature of the invention, since typically a plurality of valve assemblies are provided, they should practically have a common hydraulic seal. In a feature of the invention for protecting against over pressure, the shaped part therefore has an annular conduit, which communicates with the conduit of each housing block and which has one hydraulic seal that is common to all of the valve assemblies.

The advantages attained with the invention are in particular that adequate tightness is assured by a hydraulic seal on the side of the safety valve which is impinged upon by pressure. Moreover, by a purposefully reduced heat insulation of the valve assembly or of each valve assembly, temperature shocks at the valve neck and/or valve plate and/or in the housing block in the valve response mode or the testing mode is reliably avoided. Since the conduit, or each conduit, for the hydraulic seal is disposed inside the shaped part and inside the housing block, it is unnecessary to use pipelines, curved pipes and shaped parts that extend in the open, and a compact structure is achieved.

Other features which are considered as characteristic for the invention are set forth in the appended claims.

Although the invention is illustrated and described herein as embodied in an apparatus for securing a pressure vessel against over pressure loss, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
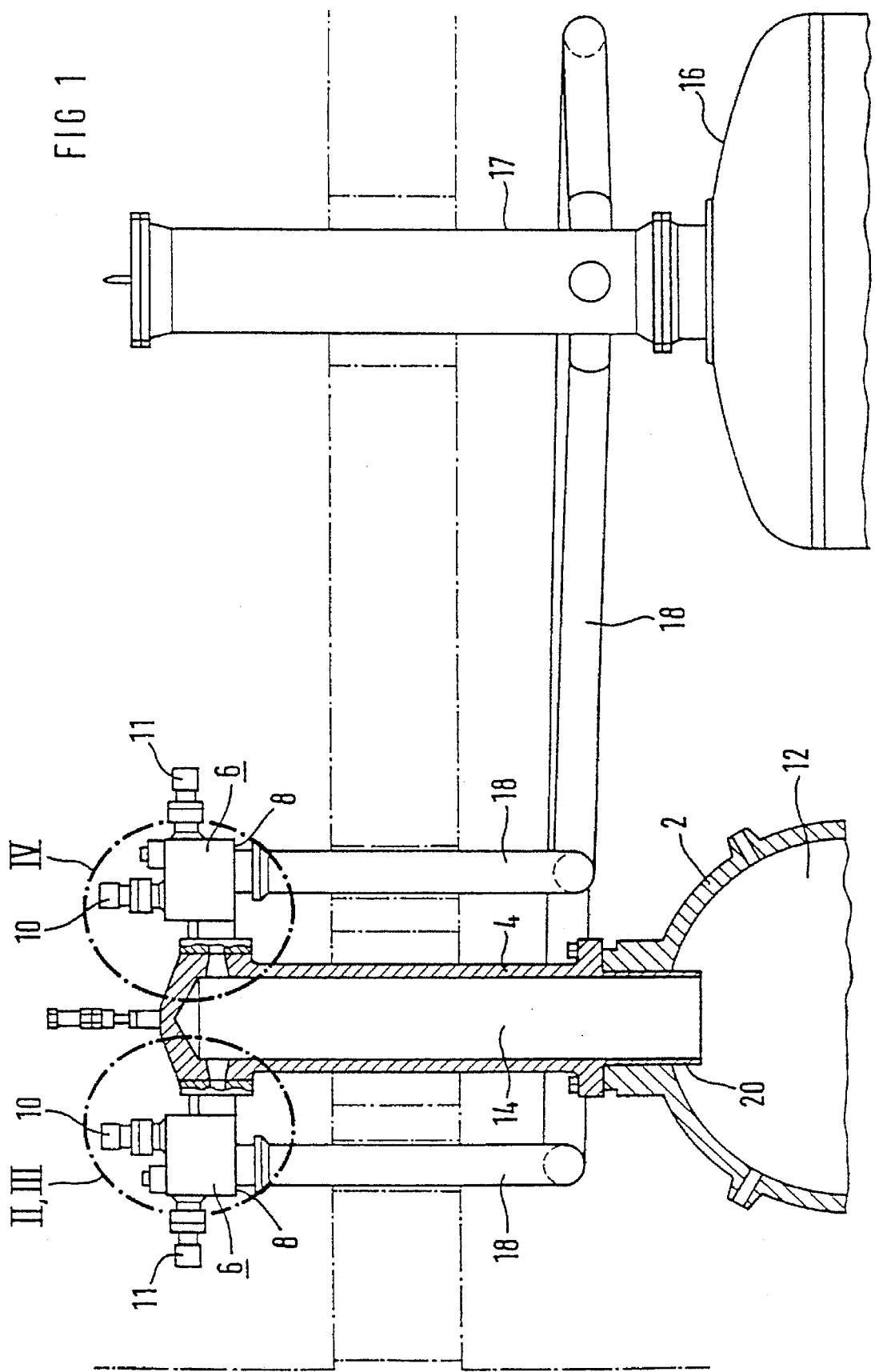
FIG. 1 is a fragmentary, diagrammatic, partly sectional, elevational view of a pressure vessel with a shaped part (pressurizer dome) mounted on it and with a blowoff vessel connected to it through a plurality of valve assemblies.

Referring now in detail to the figures of the drawing, in which elements that correspond to one another are provided with the same reference numerals, and first, particularly, to FIG. 1 thereof, there is seen a pressure vessel 2 that is provided with a neck or shaped part 4, which in power plant technology is also known as a pressurizer dome. A plurality of valve assemblies 6 have housing blocks 8 that are radially flanged to the cylindrical shaped part 4. The shaped part 4 is set on the pressure vessel 2 and is flanged to it there.

The valve assemblies 6, each of which contain a safety valve 10 and a valve 11, connect an interior 12 of the pressure-carrying pressure vessel 2, through an interior 14 of the likewise pressure-carrying shaped part 4, to a pressureless blowoff vessel 16. The blowoff vessel 16 communicates with the valve assemblies 6 through a blowoff dome 17 thereof and blowoff lines 18 connected to the dome 17.

Figure 2:
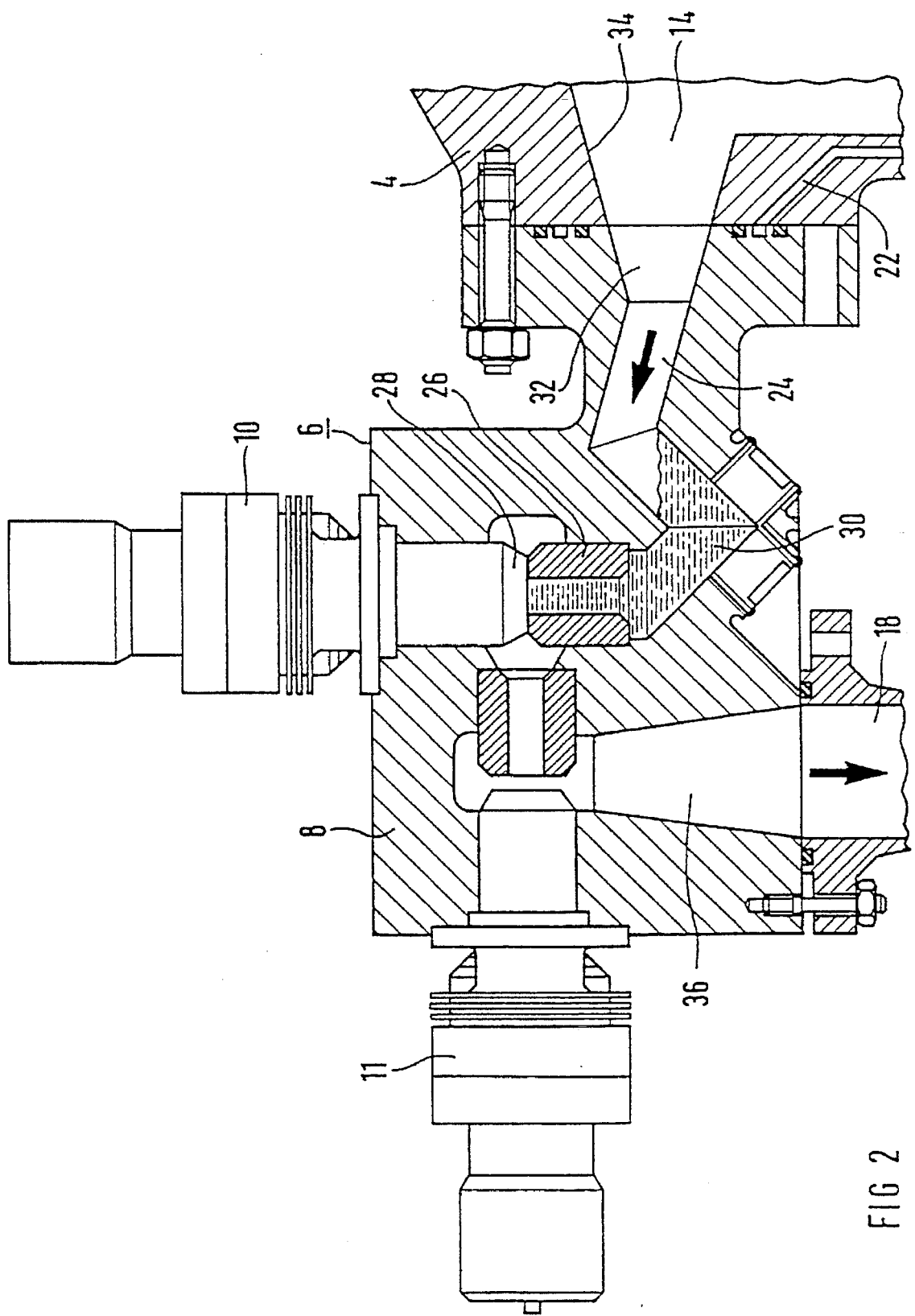
FIGS. 2 and 3 are enlarged, fragmentary, sectional views of respective portions II and III of FIG. 1, each with one valve assembly and an internal hydraulic seal in the housing.
Figure 3:
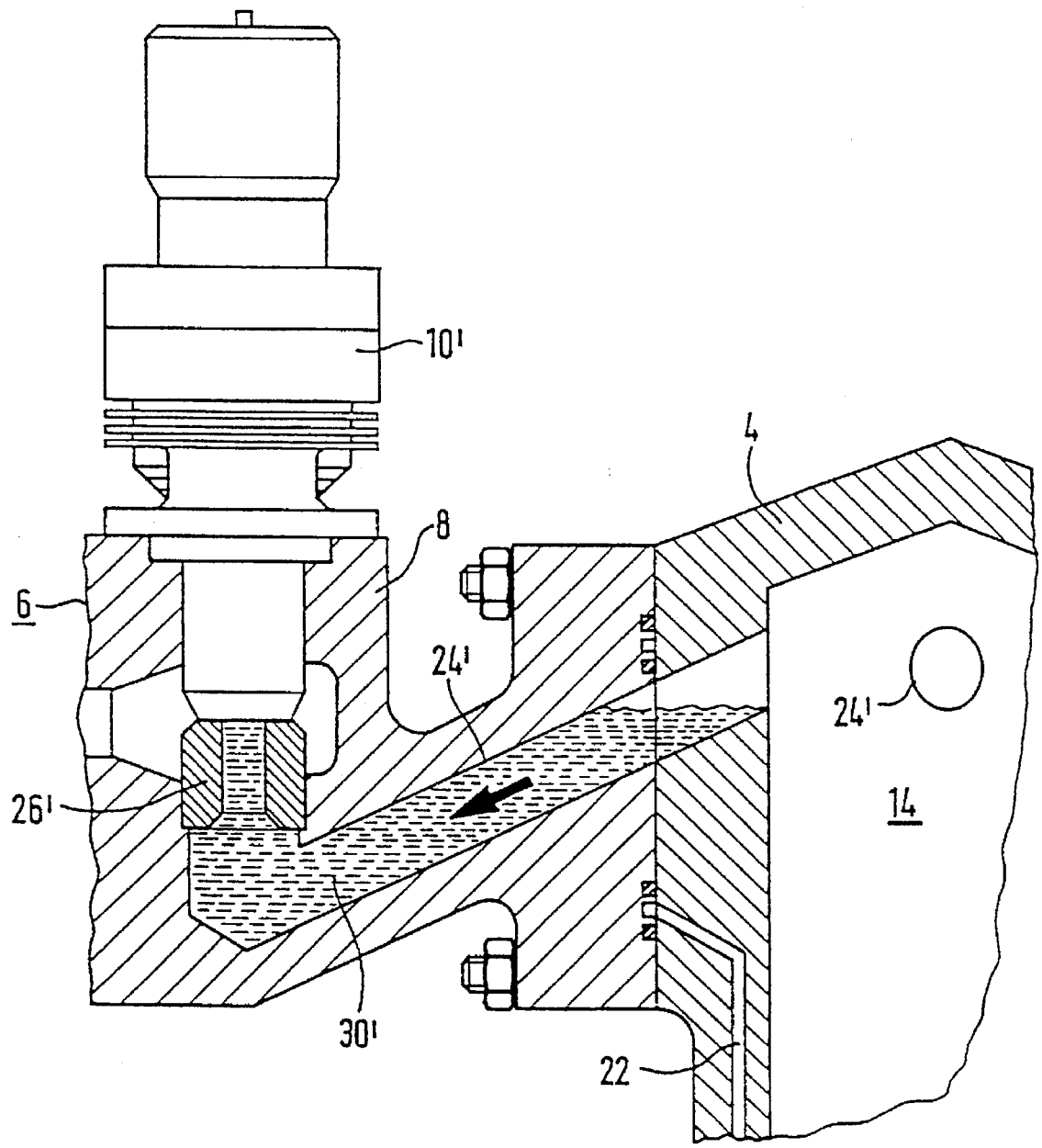
Figure 4:
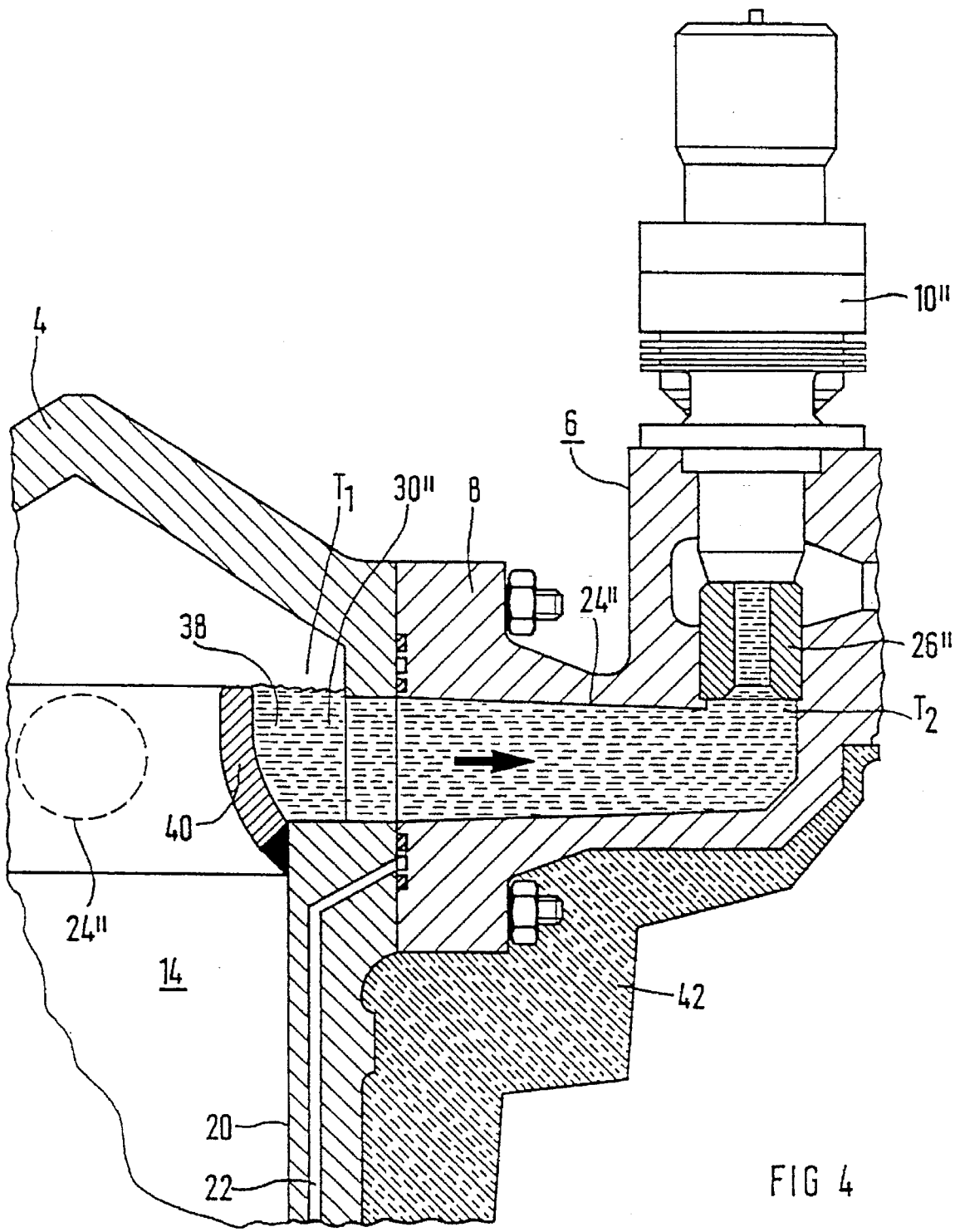
FIG. 4 is an enlarged, fragmentary, sectional view of a portion IV of FIG. 1 on a larger scale, with one hydraulic seal being common to all of the valve assemblies.

A cuff 20 provided inside the shaped part 4 and protruding into the pressure vessel 2 serves to form a pressure extraction conduit 22, which can be seen in FIGS. 2-4. As is already known from German Published, Non-Prosecuted application DE 40 41 418 A1, corresponding to U.S. application Ser. No. 08/080,569, filed Jun. 21, 1993, which was mentioned above, the pressure extraction conduit or pressure holding bore 22 communicates through non-illustrated pilot valves with non-illustrated control conduits provided inside the valve assemblies 6.

As is shown in FIG. 2, the valve assembly 6 has a conduit 24 inside its housing block 8. The conduit 24 extends between the interior 14 of the shaped part 4 and a valve seat 26 of a closed safety valve 10. In the siphon-like conduit 24, there is a hydraulic seal 30 that extends as far as a valve plate 28 of the closed safety valve 10. At a transition between the shaped part 4 and the housing block 8, a mouth 32 of the conduit 24 in the housing block 8 is adapted to an outlet opening 34 of the shaped part 4.

In FIG. 2, a blowoff conduit 36 that is sealed off from the safety valve 10 is shown, with the valve 11 half open. The blowoff conduit 36 is likewise located in the housing block 8 and it communicates with the blowoff vessel 16 through the blowoff line 18. The pressure extraction conduit 22 extends inside the wall of the shaped part 4 and within the housing block 8 in a non-illustrated manner.

In the exemplary embodiment shown in FIG. 3, a conduit 24', which is filled almost completely with water, extends obliquely downward inside the housing block 8 and is likewise constructed in siphon-like fashion. A hydraulic seal 30' in this case extends from the interior 14 of the shaped part 4 to a valve seat 26' of a safety valve 10'. As in the exemplary embodiment of FIG. 2, the pressure extraction conduit 22 is again shown in the wall of the shaped part 4.

In the preferred exemplary embodiment shown in FIG. 4, a conduit 24" for a hydraulic seal 30" extends substantially horizontally. The conduit 24" communicates with an annular conduit 38 provided inside the shaped part 4. The annular conduit 38 is formed by a shoulder 40, in particular one extending all the way around, that is formed onto the cuff 20 of the shaped part 4. The conduits 24" of the other valve assemblies 6, which are distributed over the circumference of the shaped part 4, also communicate with the annular conduit 38 like taps, so that all of the conduits 24" have one common hydraulic seal 30".

At least part of the shaped part 4 and the housing block 8 of the valve assembly 6 is surrounded by a heat insulation 42, only part of which is shown in FIG. 4. It can be seen that the wall thickness of the heat insulation 42 decreases along the housing block 8, from the shaped part 4 to a valve seat 26". Through the use of this kind of insulating provision, it is possible to vary or adjust the water temperature of the hydraulic seal 30" in a simple way, so that a temperature gradient is brought about by a purposeful imposition of heat on the housing block 8. In a practical way, beginning at a temperature $T_1$ of the steam of approximately 300° to 350° C. in the shaped part 4, for instance at the transition from steam to water, a temperature $T_2$ of approximately 150° to 250° C. is established in the region of the valve seat 26". This temperature $T_2$ can be monitored through the use of non-illustrated thermocouples disposed at various locations on the housing block 8.

In a normal operating mode, water derived from condensed steam collects in conduit 24" upstream from the closed safety valve 10". The water creates a hydraulic seal 30" in the conduit or in each conduit 24" and in the annular conduit 38 which is common to all of the valve assemblies 6.

In the demand mode, with the safety valve 10" opened, the water initially flows out across the valve seat 26" from the hydraulic seal 30" created in the normal operating mode, followed then by hot steam, so that a temperature shock in the housing block 8 is reliably averted by the establishment of the aforementioned temperature gradient. As mentioned, the hydraulic seal 30" averts thermal distortion of the valve plate and hence helps to avert leakage from the valve plate.

We claim:

1. An apparatus for securing a pressure vessel against over pressure, comprising:

a shaped part connected to a pressure vessel; and a valve assembly disposed on said shaped part, said valve assembly including a housing block, a safety valve having a valve seat disposed in said housing block, a hydraulic seal for said safety valve, and a conduit disposed inside at least one of said housing block and said shaped part for receiving said hydraulic seal.

2. The apparatus according to claim 1, including at least one other valve assembly, said valve assemblies distributed circumferentially over said shaped part.

3. The apparatus according to claim 1, including two other valve assemblies, said three valve assemblies distributed circumferentially over said shaped part.

4. The apparatus according to claim 1, wherein said shaped part is tubular, and said valve assembly is flanged radially to said tubular shaped part.

5. The apparatus according to claim 2, wherein said shaped part is tubular, and said valve assemblies are flanged radially to said tubular shaped part.

6. The apparatus according to claim 1, wherein said valve assembly has a heat insulation with an insulating action decreasing along said conduit for said hydraulic seal.

7. The apparatus according to claim 2, wherein said valve assemblies each have a heat insulation with an insulating action decreasing along said conduit for said hydraulic seal.

8. The apparatus according to claim 1, wherein said conduit in said housing block for said hydraulic seal is a siphon-type conduit.

9. The apparatus according to claim 2, wherein said conduits in said housing blocks for said hydraulic seals are siphon-type conduits.

10. The apparatus according to claim 2, wherein said shaped part has an annular conduit communicating with said conduit in said housing block of each of said valve assemblies, and said hydraulic seal in said conduit of each of said valve assemblies is one hydraulic seal being common to all of said valve assemblies.

* * * * *